(12) United States Patent
Kim et al.

(10) Patent No.: US 9,083,572 B2
(45) Date of Patent: Jul. 14, 2015

(54) CHANNEL ESTIMATION METHOD AND APPARATUS

(75) Inventors: Joo Han Kim, Yongin-si (KR); Chae Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 13/291,490

(22) Filed: Nov. 8, 2011

(65) Prior Publication Data

US 2012/0114085 A1     May 10, 2012

(30) Foreign Application Priority Data

Nov. 8, 2010   (KR) .................. 10-2010-0110306

(51) Int. Cl.
  *H04K 1/10*   (2006.01)
  *H04L 27/28*  (2006.01)
  *H04L 25/02*  (2006.01)

(52) U.S. Cl.
  CPC .......... *H04L 25/022* (2013.01); *H04L 25/0224* (2013.01)

(58) Field of Classification Search
  CPC ........................ H04L 25/022; H04L 25/0224
  USPC ................................ 375/260, 267, 316, 346
  See application file for complete search history.

(56) References Cited

U.S. PATENT DOCUMENTS 7,852,958 B2 * 12/2010 Kisoda et al. .................. 375/260
8,457,224 B2 *  6/2013 Kimata ........................ 375/260
2008/0144730 A1 *  6/2008 Akella et al. ................. 375/260
2008/0267320 A1 * 10/2008 Dateki .......................... 375/316
2008/0304605 A1 * 12/2008 Aziz et al. ..................... 375/347
2009/0148164 A1 *  6/2009 Roberts et al. ................. 398/65
2014/0337704 A1 * 11/2014 Tang et al. .................... 715/219

FOREIGN PATENT DOCUMENTS

JP            10109817 A    *  4/1998
KR    10-2009-0013957 A       2/2009

OTHER PUBLICATIONS

Baoguo Yang et al., "Analysis of Low-Complexity Windowed DFT-Based MMSE Channel Estimator for OFDM Systems", Transactions on Communications, Nov. 2011, vol. 49, No. 11.

* cited by examiner

*Primary Examiner* — Freshteh N Aghdam
(74) *Attorney, Agent, or Firm* — Jefferson IP Law, LLP (57) ABSTRACT

A method and apparatus for estimating a channel efficiently though pilot subcarrier signal transformation and noise reduction in the mobile communication system are provided. The apparatus includes a time domain transformer for transforming received pilot subcarrier signals to time domain signals, a noise reducer for reducing noises of the time domain signals, a frequency domain transformer for transforming the noise-reduced time domain signals to frequency domain signals, and a final channel estimator for estimating channel values of data subcarriers received using the frequency domain signals. The channel estimation method and apparatus of improves performance with the reduction of computational complexity.

10 Claims, 11 Drawing Sheets

CHANNEL ESTIMATION METHOD AND APPARATUS

PRIORITY

This application claims the benefit under 35 U.S.C. §119(a) of a Korean patent application filed on Nov. 8, 2010 in the Korean Intellectual Property Office and assigned Serial No. 10-2010-0110306, the entire disclosure of which is hereby incorporated by reference.

BACKGROUND OF THE INVENTION

1. Field of the Invention

The present invention relates to a channel estimation method and apparatus of a mobile communication system. More particularly, the present invention relates to a method and apparatus for estimating a channel efficiently through pilot subcarrier signal transformation and noise reduction in a mobile communication system.

2. Description of the Related Art

In Orthogonal Frequency Division Multiplexing (OFDM) systems, channel estimations are performed in a time frequency domain or a frequency domain. It is well-known in the art that the time domain channel estimation technique based on Discrete Fourier Transform (DFT) or Discrete Cosine Transform (DCT) is superior to the frequency domain channel estimation technique in performance under the same complexity. Channel estimation techniques based on DFT or DCT, according to the related art, require N-point DFT (DCT). Here, N is the total number of subcarriers for data and pilot or the total number of subcarriers for the data, pilot, and guard band.

In spite of its lower computation requirements, linear polarization has a large channel estimation error. The channel estimation error of the linear polarization technique causes degradation of a channel estimation performance, resulting in degradation of a system throughput. Meanwhile, a Minimum Mean-Square Error (MMSE) estimation guaranteeing an accurate channel requires previous statistical knowledge on the channel. The MMSE estimator also has high computational complexity of matrix inversion, resulting in difficulty of use. In order to implement the DFT (DCT)-based channel estimator according to the related art, N-point DFT (DCT) computations are required once or twice. Accordingly, complexity of the estimator mainly depends on an implementation of the N-point DFT (DCT). As described above, N is the total number of the subcarriers for data and pilot or the total number of the subcarriers for data, pilot, and guard band.

Mobile communication systems are developed to provide subscribers with voice communication services on the move. With the rapid advance of technologies, the mobile communication systems have evolved to support high speed data communication services as well as standard voice communication services. As N increases, both hardware implementation complexity and computation time increases.

SUMMARY OF THE INVENTION

Aspects of the present invention are to address at least the above-mentioned problems and/or disadvantages and to provide at least the advantages described below. Accordingly, an aspect of the present invention is to provide a channel estimation method and apparatus that is capable of minimizing complexity while improving estimation performance.

In accordance with an aspect of the present invention, a channel estimation apparatus is provided. The apparatus includes a time domain transformer for transforming received pilot subcarrier signals to time domain signals, a noise reducer for reducing noises of the time domain signals, a frequency domain transformer for transforming the noise-reduced time domain signals to frequency domain signals, and a final channel estimator for estimating channel values of data subcarriers received using the frequency domain signals.

In accordance with another aspect of the present invention, a channel estimation method is provided. The method includes transforming received pilot subcarrier signals to time domain signals, reducing noise from the transformed time domain signals, transforming the noise reduced time domain signals to frequency domain signals, and estimating channel values of data subcarriers using the frequency domain signals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, certain elements may be exaggerated or omitted or schematically depicted for clarity of the invention, and the actual sizes of the elements are not reflected. The same reference numbers are used throughout the drawings to refer to the same or like parts.

Exemplary embodiments of the present invention provide a channel estimation method and apparatus with reference to the accompanying drawings.

In an exemplary embodiment of the present invention, Discrete Fourier Transform (DFT) (Discrete Cosine Transform (DCT)) complexity may be reduced with an M-point DFT (DCT) and Minimum Mean-Square Error (MMSE) technique. Here, M denotes a number of pilot subcarriers or the sum of the number of pilot subcarriers and a number of guard band subcarriers.

A Channel Impulse Response (CIR) can be modeled according to Equation (1). In Equation (1), L denotes a number of channel paths, and $h_l$ denotes an lth channel impulse response.

$$h(n) = \sum_{l=0}^{L-1} h_l \delta(n-l) \quad \text{Equation (1)}$$

A received signal y(n) can be expressed in the form of a circular convolution of a transmit signal x(n) and a channel impulse response h(n), i.e. Equation (2). In Equation (2), n(n) denotes noise.

$$y(n) = h(n) \otimes x(n) + n(n) \quad \text{Equation (2)}$$

Equation (3) represents a signal after removing a guard period from a received signal and performing Fast Fourier Transform (FFT) at a receiver. In Equation (3), Y(k) denotes the received signal of a kth subcarrier, X(k) denotes a kth transmit signal, N(k) denotes a kth noise, and H(k) denotes a frequency response of a kth channel.

$$Y(k) = H(k)X(k) + N(k) \quad \text{Equation (3)}$$

Figure 1:
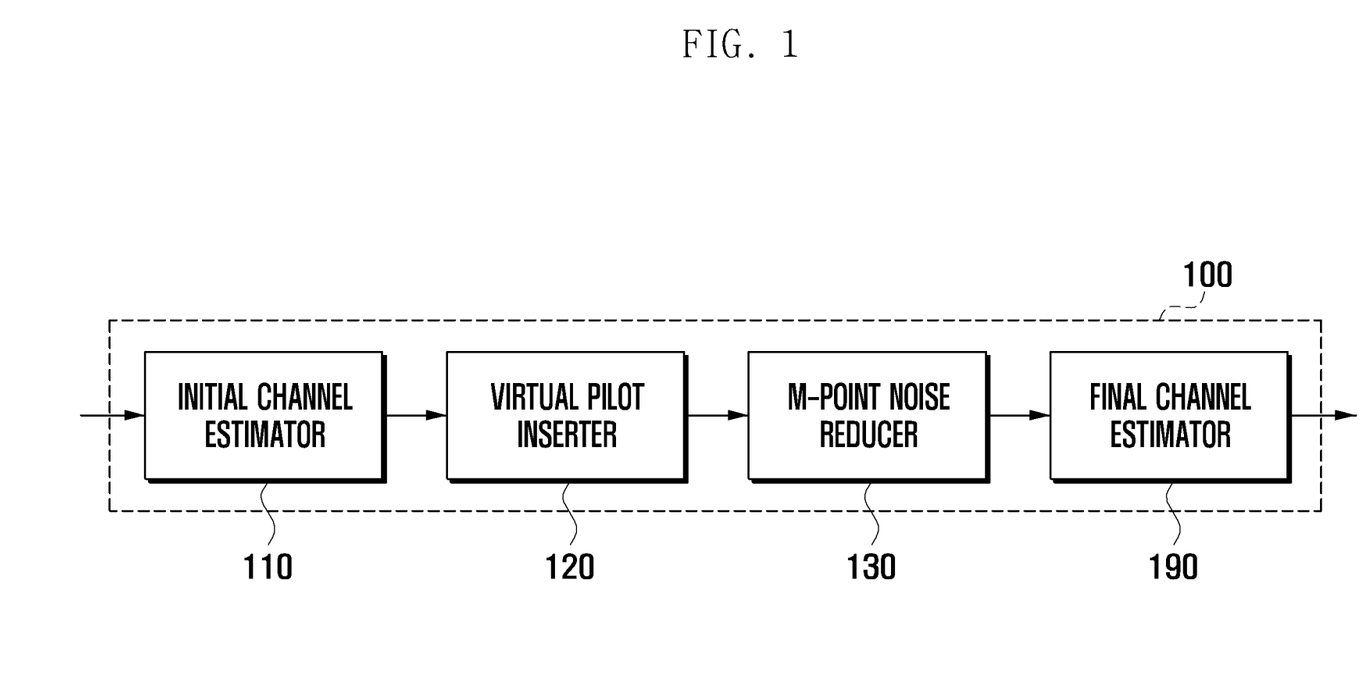
FIG. 1 is a block diagram illustrating a configuration of a channel estimation apparatus according to an exemplary embodiment of the present invention.

FIG. 1 is a block diagram illustrating a configuration of a channel estimation apparatus according to an exemplary embodiment of the present invention.

Referring to FIG. 1, the channel estimation apparatus 100 includes an initial channel estimator 110, a virtual pilot inserter 120, an M-point noise reducer 130, and a final channel estimator 190.

Operations and configurations of the internal function blocks of the channel estimation apparatus 100 are described below in more detail with reference to FIG. 2.

Figure 2:
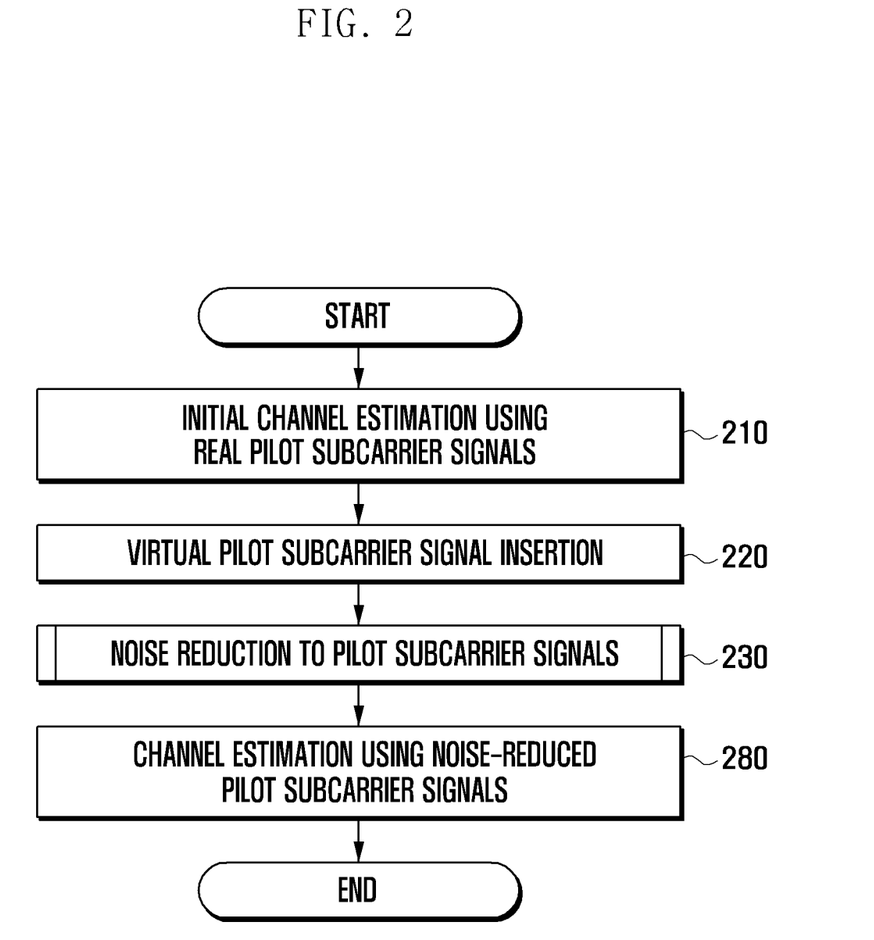
FIG. 2 is a flowchart illustrating a channel estimation method according to an exemplary embodiment of the present invention.

FIG. 2 is a flowchart illustrating a channel estimation method according to an exemplary embodiment of the present invention.

An initial channel estimator 110 performs initial channel estimation at step 210. For example, the initial channel estimator 110 performs initial estimation using the received pilot symbols, i.e. Reference Symbol (RS), with a Least Square (LS) method. The initial channel estimator 110 can perform the initial channel estimation using Equation (4). Equation (4) is applied to the pilot symbols.

$$Y_{RS}(k) = H_{RS}(k)X_{RS}(k) + N_{RS}(k), k=1,2,\ldots M_P \hat{H}_{RS}(k) = Y_{RS}(k)/X_{RS}(k) \quad \text{Equation (4)}$$

In Equation (4), $Y_{RS}(k)$ denotes a kth received signal, $X_{RS}(k)$ denotes a kth transmit signal, $N_{RS}(k)$ denotes a kth noise, $H_{RS}(k)$ denotes a frequency response of a kth channel, and $\hat{H}_{RS}(k)$ denotes the frequency response of the kth channel which is estimated by the LS method, i.e. a channel value. Since the initial channel estimation method is well-known in the art, a detailed description thereof is omitted herein.

A virtual pilot inserter 120 inserts a virtual pilot into a pilot symbol at step 220. An exemplary implementation can be facilitated when the number of pilot symbols is square of 2 in a noise reduction process. Accordingly, it is necessary to insert guard bands as the virtual pilots such that the sum of the number of the real pilot symbols and the number of virtual pilot symbols become square of 2. Padding 0s in the guard bands or copying the pilot symbol value of the band-edge can be used as the value of the virtual band. In an exemplary implementation, the sum of the number of virtual pilot symbols, i.e. the guard bands, and the number of real pilot symbols is referred to as M.

In a case where it is not necessary to make the number of the pilot symbols equal to square of 2 in the noise reduction process, step 220 and the virtual pilot inserter 120 may be omitted. Also, if it is guaranteed that the number of pilot symbols is square of 2, step 220 and the virtual pilot inserter 120 may be omitted.

The M-point noise reducer 130 performs noise reduction on pilot symbols as the result of the initial channel estimation and the guard bands inserted by the virtual pilot inserter 120 at step 230. Step 230 and the operation of the M-point noise reducer 130 are described in more detail below with reference to FIGS. 3A to 4B.

Figure 3A:
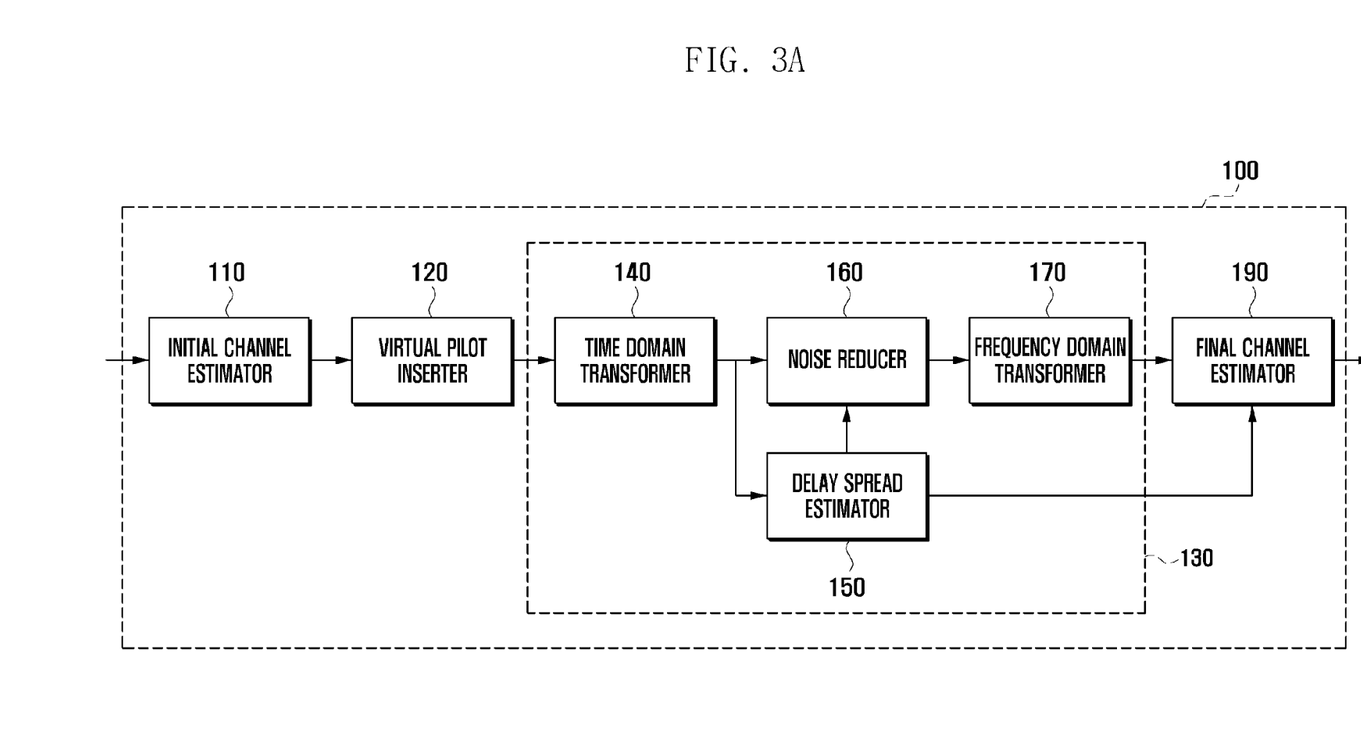
FIG. 3A is a block diagram of an M-point noise reducer of a channel estimation apparatus according to an exemplary embodiment of the present invention.

FIG. 3A is a block diagram illustrating a configuration of an M-point noise reducer of a channel estimation apparatus according to an exemplary embodiment of the present invention.

Referring to FIG. 3A, the M-point noise reducer 130 includes a time domain transformer 140, a delay spread estimator 150, a noise reducer 160, and a frequency domain transformer 170.

An operation of the internal function blocks of the M-point noise reducer 130 is described in more detail below with reference to FIG. 3B.

Figure 3B:
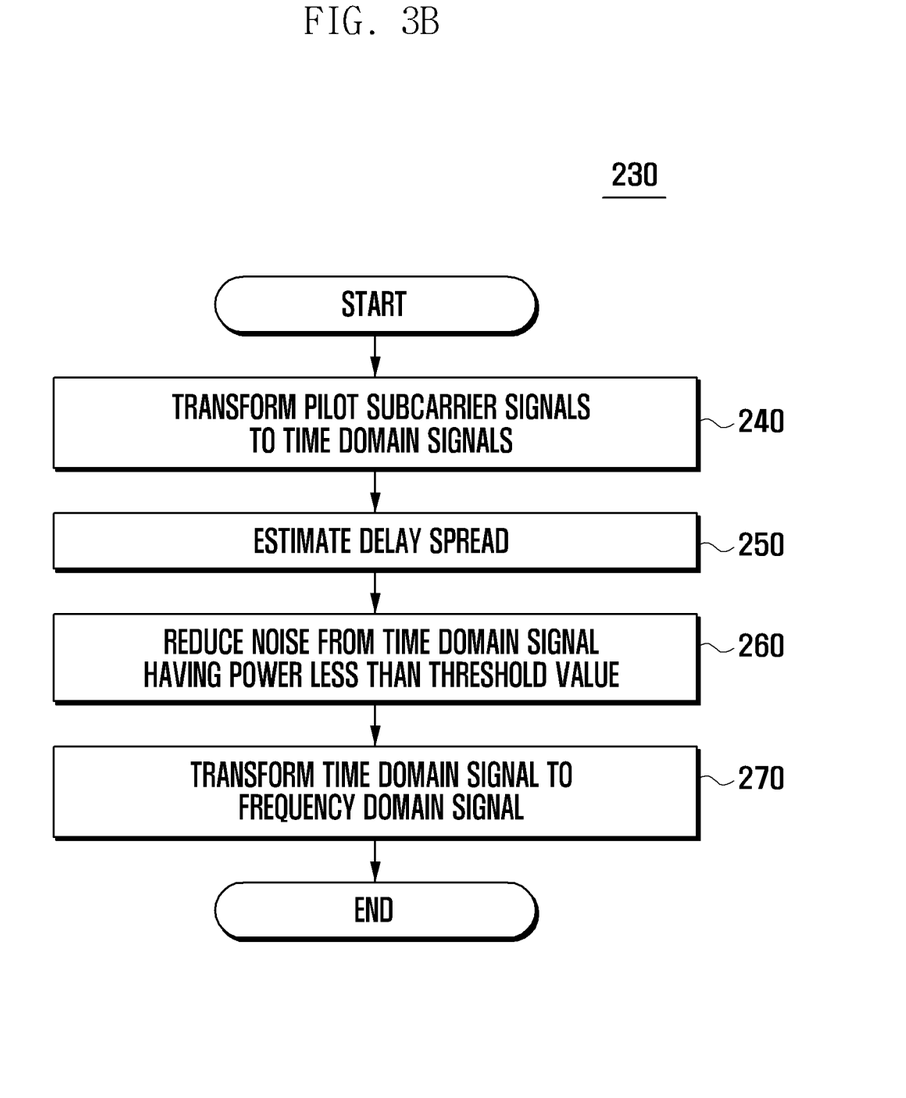
FIG. 3B is a flowchart illustrating a method for noise reduction to pilot subcarrier signals according to an exemplary embodiment of the present invention.

FIG. 3B is a flowchart illustrating a method for noise reduction to pilot subcarrier signals according to an exemplary embodiment of the present invention.

Referring to FIG. 3A, a time domain transformer 140 transforms pilot symbols on an initially estimated channel and virtual pilot symbols inserted by the virtual pilot inserter 120. The transformation can be done with one of an Inverse Fast Fourier Transform (IFFT), an Inverse Discrete Fourier Transform, and a Discrete Cosine Transform (DCT). As described above, when the virtual pilot symbol insertion is not necessary, only the pilot symbols on an initially estimated channel can be transformed in a time domain. Since the transformation of the signal from the frequency domain to the time domain is well-known in the art, a detailed description thereof is omitted herein.

Figure 5:
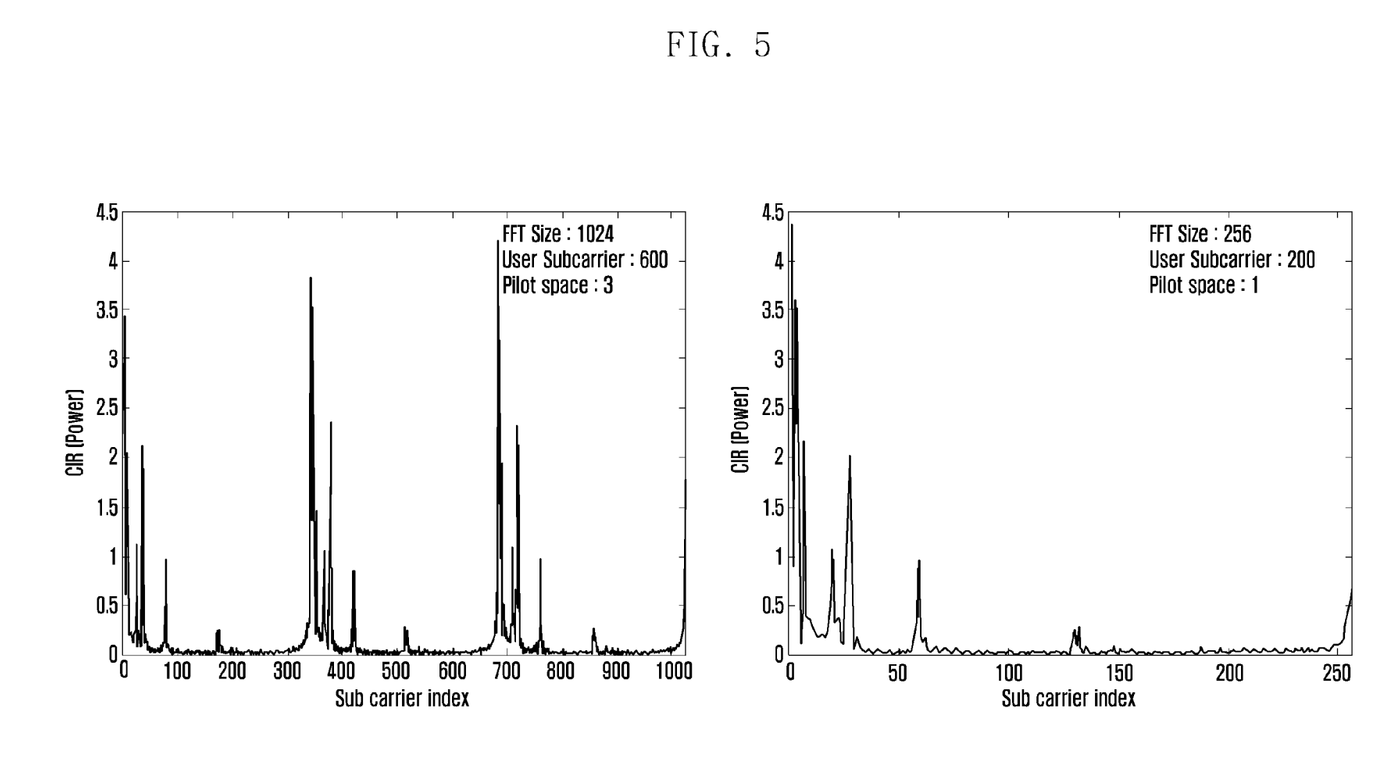
FIG. 5 illustrates graphs of a Channel Impulse Response (CIR) in signal transformation from a frequency domain to a time domain according to an exemplary embodiment of the present invention.

FIG. 5 illustrates graphs of a CIR in signal transformation from the frequency domain to a time domain according to an exemplary embodiment of the present invention.

Referring to FIG. 5, a first graph (on the left side) illustrates a case in which all signals, i.e. pilot and data symbols, have been transformed in the method according to the related art. In the first graph, the signal transformation takes a long time with a repeated appearance of CIR. A second graph (on the right side) illustrates a case in which the transformation has been performed on the pilot symbols, i.e. the real pilot symbols and the virtual pilot symbols (i.e., guard bands) according to an exemplary embodiment of the present invention. In the second graph, the signal transformation takes a short time with an appearance of the CIR once.

Returning to FIGS. 3A and 3B, at step 250, the delay spread estimator 150 estimates the delay spread of a time domain signal transformed at step 240. The delay spread estimation of the time domain signal is well-known in the art. Therefore, a detailed description thereof is omitted herein. The estimated delay spread information can be used in the MMSE process at step 280 and the noise reduction process at step 260.

At step 260, the noise reducer 160 performs noise reduction from the time domain signal transformed at step 240. At this time, multipath information of the channel and the delay spread information can be used for noise reduction. The noise reducer 160 can use Equation (5) to reduce noise:

$$y'(n) = \begin{cases} y(n), & |y(n)|^2 \geq \mu\sigma^2 \\ \beta \cdot y(n), & |y(n)|^2 < \mu\sigma^2 \end{cases} \quad \text{Equation (5)}$$

$$n = 0, 1, 2, \ldots, M-1, 0 \leq \beta \leq 1, 1 \leq \mu$$

where y(n) denotes the time domain signal transformed, and y'(n) denotes the noise-reduced time domain signal. The noise reducer 160 verifies the multipath of the channel and multiplies β to the channel except the channels equal to or greater than a threshold. Here, β is equal to or greater than 0 and equal to or less than 1 (0≤β≤1). β can be set to a value showing the best efficiency according to the simulation. In an exemplary implementation, β may be equal to or greater than 0 and less than 1 (0≤β<1). That is, influence of the channel is estimated as noise by multiplying β greater than 0 and less than 1 to the channel of which power is less than a threshold value. μ denotes a threshold for removing noise components which is set to an appropriate value equal to or greater than 1 in consideration of CIR caused by the guard bands. μ also can be determined through simulation. $\sigma^2$ denotes a variance of noise.

The frequency domain transformer 170 transforms the noised-reduced time domain signal to the frequency domain signal again at step 270. In order to transform the time domain signal to the frequency domain signal, it is possible to use at least one of a Fast Fourier Transform (FFT), a Discrete Fourier Transform (DFT), and an Inverse Discrete Cosine Transform (IDCT). Since the transformation from the time domain signal to the frequency domain signal is well-known in the art, a detailed description thereof is omitted herein.

Returning to FIG. 2, at step 280, the final channel estimator 190 estimates the channel value of the data subcarrier using an MMSE method to the frequency domain signal transformed at step 270.

Figure 4A:
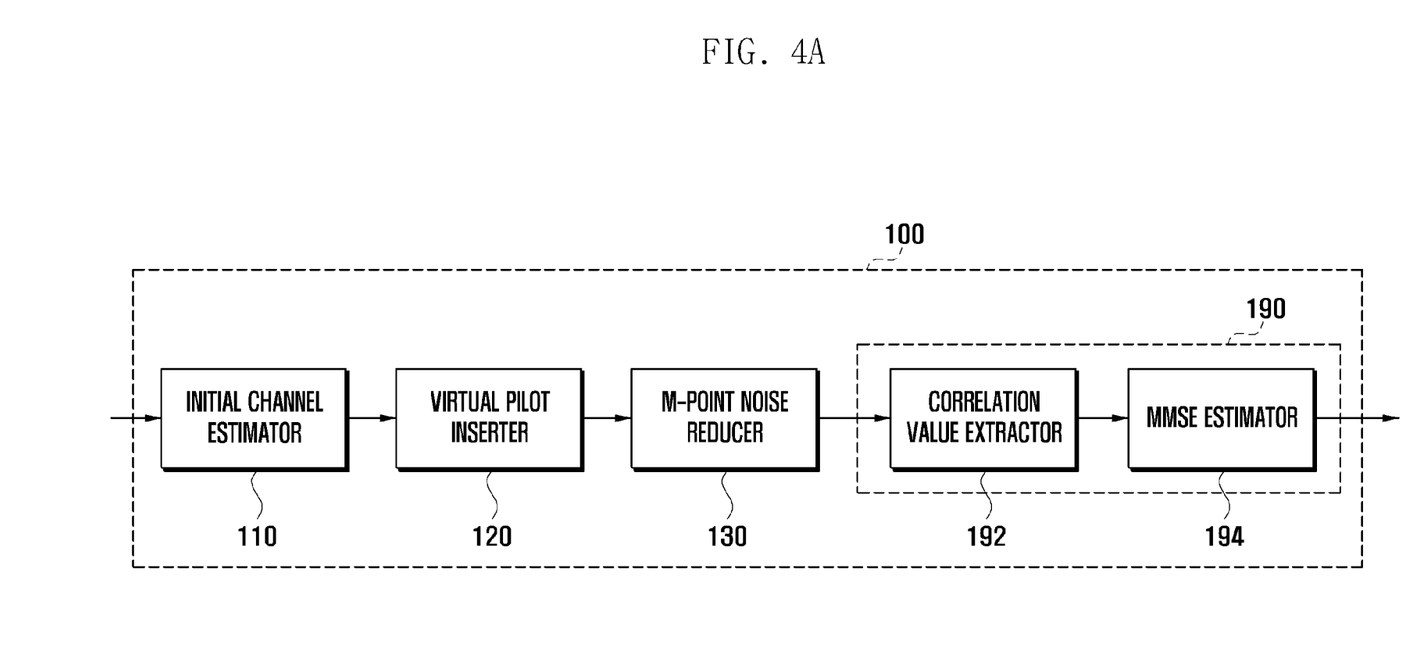
FIG. 4A is a block diagram of a final channel estimator of a channel estimation apparatus according to an exemplary embodiment of the present invention.

FIG. 4A is a block diagram illustrating a configuration of a final channel estimator of a channel estimation apparatus according to an exemplary embodiment of the present invention.

Referring to FIG. 4A, the final channel estimator 190 includes a correlation value extractor 192 and an MMSE estimator 194.

Configurations and operations of the correlation value extractor 192 and the MMSE estimator 194 are described in more detail below with reference to FIG. 4B.

Figure 4B:
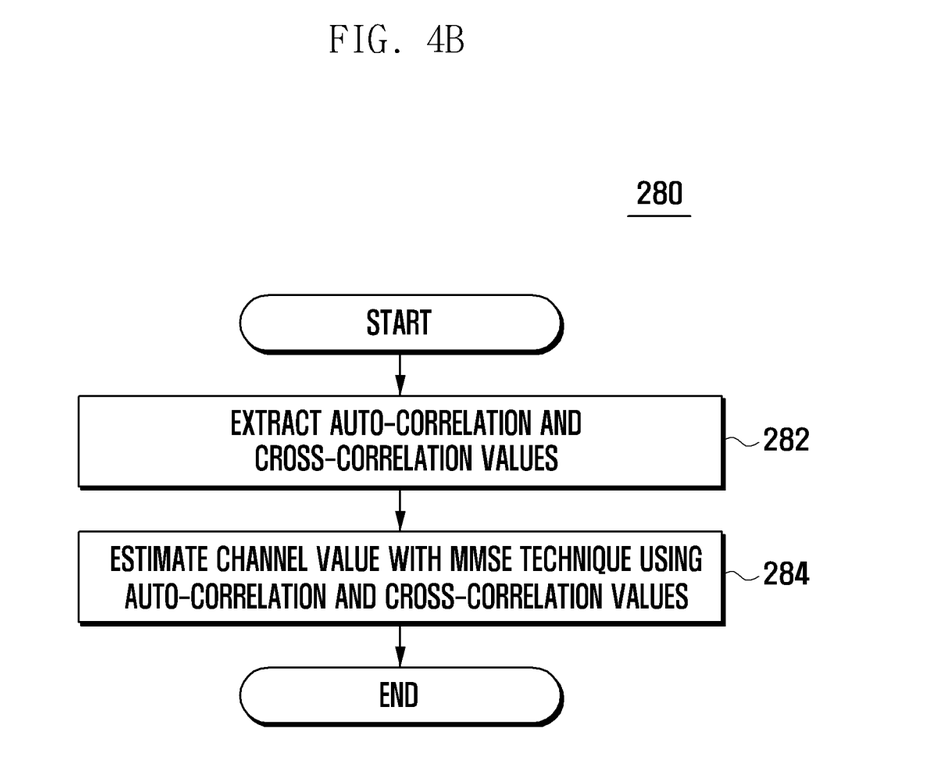
FIG. 4B is a flowchart illustrating a method for channel estimation using noise-reduced pilot subcarrier signals according to an exemplary embodiment of the present invention.

FIG. 4B is a flowchart illustrating a method for channel estimation using noise-reduced pilot subcarrier signals according to an exemplary embodiment of the present invention.

Referring to FIG. 4B, the correlation value extractor 192 extracts an auto-correlation value $R_{pp}$ between the pilot and data subcarriers and the cross-correlation value $R_{pd}$ between the pilot subcarrier and the data subcarrier at step 282.

The values $R_{pp}$ and $R_{pd}$ are statistically obtained values of a channel for performing the MMSE-base channel estimation. The correlation value extractor 192 can obtain the approximate values of $R_{pp}$ and $R_{pd}$ from the time domain signal y(n). In order to obtain approximate values of $R_{pp}$ and $R_{pd}$, the correlation value extractor 192 can use an exponential decay approximation method. Since the exponential decay approximation method is well-known in the art, a detailed description thereof is omitted herein.

The MMSE estimator 194 estimates a channel value using the $R_{pp}$ and $R_{pd}$ based on the Minimum Mean-Square Error (MMSE) method at step 284.

The $w_{mmse}$ used for channel estimation of the MMSE estimator 194 can be expressed as Equation (6):

$$w_{mmse} = R_{dp}(R_{pp} + \sigma^2 I)^{-1} \quad \text{Equation (6)}$$

$$= \begin{bmatrix} R_{1,1} & R_{1,4} & R_{1,7} & R_{1,10} \\ R_{2,1} & R_{2,4} & R_{2,7} & R_{2,10} \\ \vdots & \vdots & \ddots & \vdots \\ R_{12,1} & R_{12,4} & R_{12,7} & R_{12,10} \end{bmatrix}$$

$$\begin{bmatrix} R_{1,1}+\sigma^2 & R_{1,4} & R_{1,7} & R_{1,10} \\ R_{4,1} & R_{4,4}+\sigma^2 & R_{4,7} & R_{4,10} \\ R_{7,1} & R_{7,4} & R_{7,7}+\sigma^2 & R_{7,10} \\ R_{10,1} & R_{10,4} & R_{10,7} & R_{10,10}+\sigma^2 \end{bmatrix}^{-1}.$$

The MMSE estimator 194 multiplies the $w_{mmse}$ calculated using Equation (6) with the received signal y to estimate a channel. The MMSE estimator 194 uses Equation (7) to estimate a channel value:

$$\hat{h}_{mmse} = w_{mmse} y \qquad \text{Equation (7)}$$
$$= R_{dp}(R_{pp} + \sigma^2 I)^{-1} y.$$

As described above, $R_{pp}$ is an auto-correlation value between the pilot and data subcarriers, $R_{pd}$ is a cross-correlation value between the pilot subcarrier and the data subcarrier, $\sigma^2$ denotes a variance of noise, I denotes an Identity matrix, and $\hat{h}_{mmse}$ is an estimated channel value.

The application of the MMSE method in the frequency domain is likely to require high complexity of matrix inversion and previous statistical knowledge. In an exemplary implementation, however, all pilot subcarriers are grouped by 4 (or 6, 8, or 12) to apply the MMSE method to decrease the complexity of the inverse matrix calculation. Equation (6) is a case of calculation in units of 4 subcarriers. That is, the $w_{mmse}$, which can be applied to the 1st to 12th subcarriers, is calculated using the 1st, 4th, 7th, and 10th pilot subcarriers. The 1st to 12th subcarriers include the 1st, 4th, 7th, and 10th pilot subcarriers and 2nd, 3rd, 5th, 6th, 8th, 9th, 11th, and 12th data subcarriers.

For example, if two data subcarriers exist between the pilot subcarriers, $R_{pp}$ is a 4×4 matrix. In order to calculate $w_{mmse}$, the matrix inversion of the 4×4 matrix is necessary. In this case, $w_{mmse}$ becomes a 12×4 matrix. Accordingly, the channel estimation values of 12 subcarriers, i.e. 4 pilot subcarriers and 8 data subcarriers, can be estimated using 4 pilot subcarriers.

FIGS. 6 to 9 are graphs illustrating performances of a channel estimation technique according to the related art and a channel estimation method according to an exemplary embodiment of the present invention as depicted in FIGS. 1 to 4B. In FIGS. 6 to 9, the horizontal axis denotes Signal-to-Noise Ratio (SNR), and the vertical axis denotes a Block Error Rate (BLER) of Physical Broadcast Channel (PBCH).

In FIGS. 6 to 9, a 1024 DFT method transforms data and pilot symbols to time domain signals and sets the signals less than a threshold to 0. A 1024 DFT+LMMSE method transforms the data and pilot symbols to the time domain signals and performs channel estimation on the time domain signals using an interactive localized MMSE algorithm. A 256 DFT+MMSE method performs channel estimation as described with reference to FIGS. 1 to 4B. With reference to FIGS. 6 to 9, the 1024 DFT method is referred to as the first method, and the 1024 DFT+LMMSE method as the second method.

Figure 6:
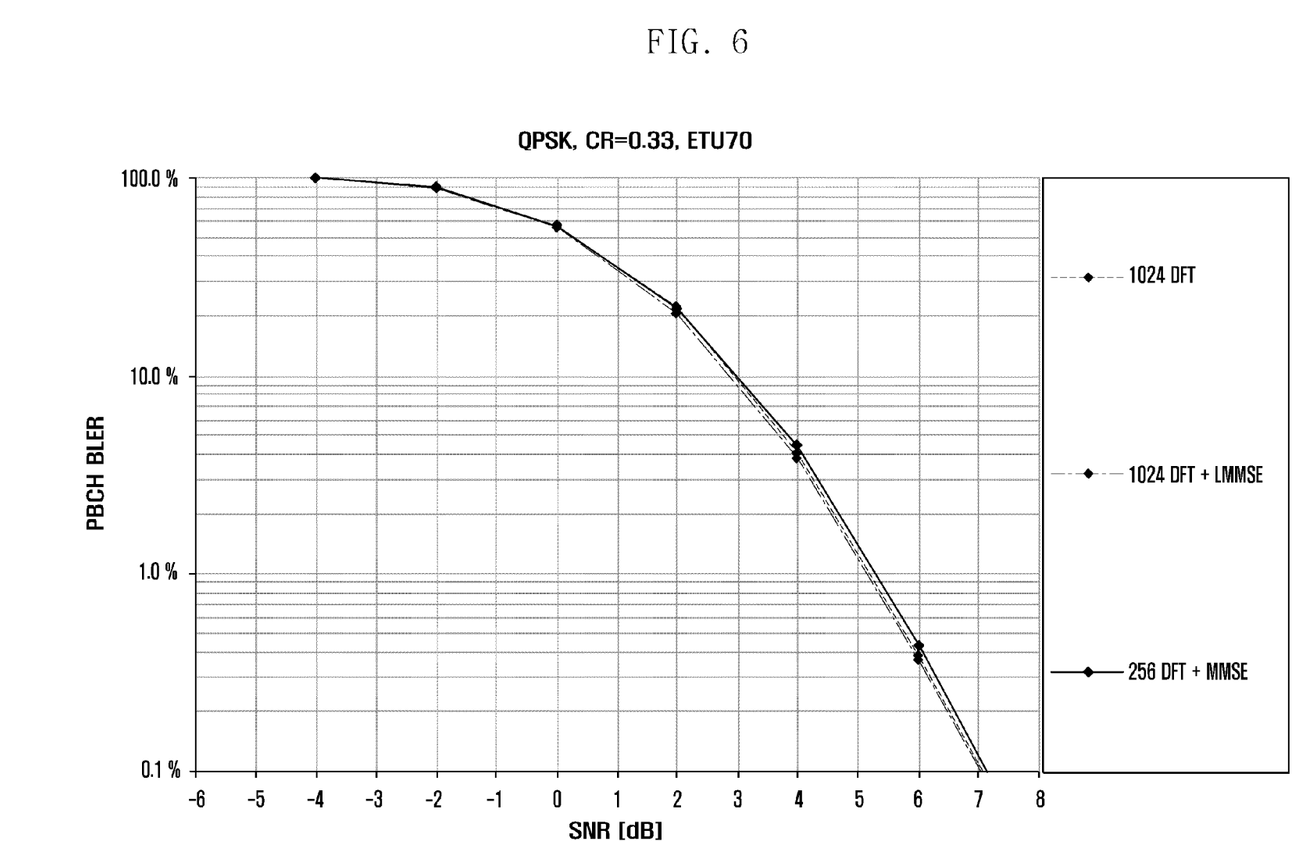
FIG. 6 is a graph illustrating a simulation result in a low Signal-to-Noise Ratio (SNR) and an Extended Typical Urban (ETU) channel environment according to an exemplary embodiment of the present invention.

FIG. 6 is a graph illustrating a simulation result in a low SNR and Extended Typical Urban (ETU) channel environment according to an exemplary embodiment of the present invention. In the low SNR environment, the first and second methods and the method according to an exemplary embodiment of the present invention show no significant difference in performance.

Figure 7:
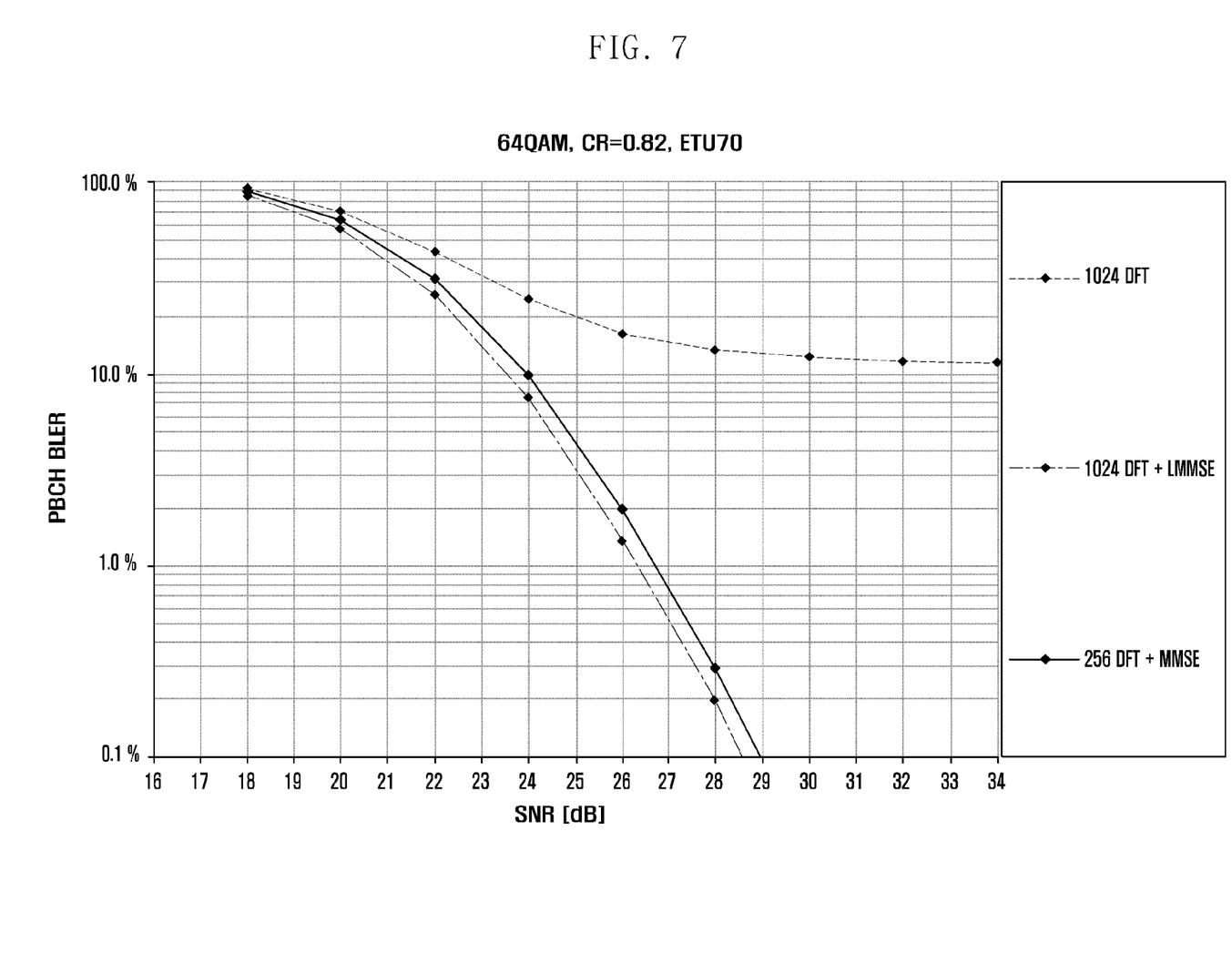
FIG. 7 is a graph illustrating a simulation result in a high SNR and an ETU channel environment according to an exemplary embodiment of the present invention.

FIG. 7 is a graph illustrating a simulation result in a high SNR and ETU channel environment according to an exemplary embodiment of the present invention. In the high SNR environment, the first method shows significant performance degradation. Although the second method shows slight performance superiority as compared to the method according to an exemplary embodiment of the present invention, such slight performance degradation is ignorable in consideration of very low complexity.

Figure 8:
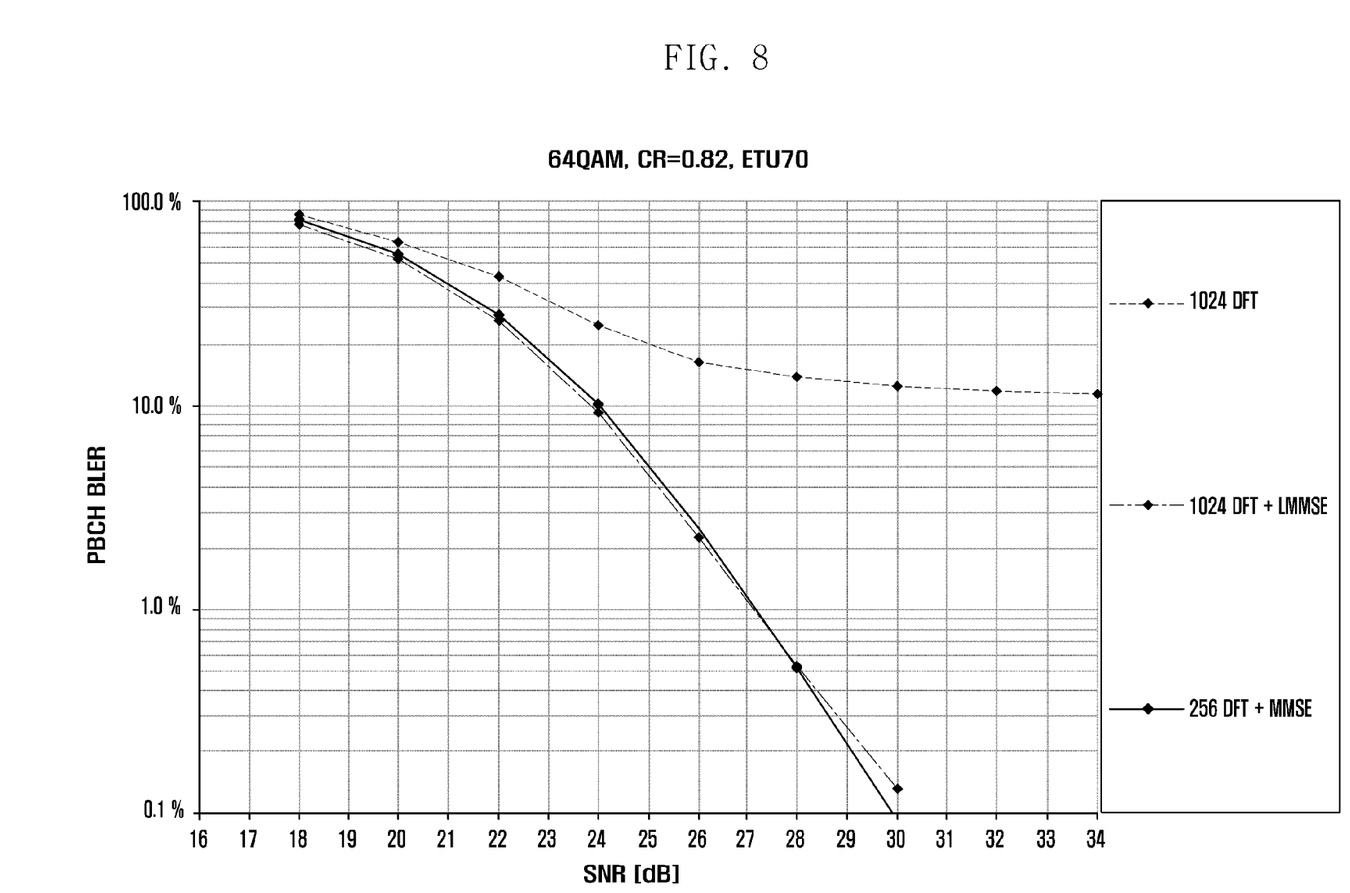
FIG. 8 is a graph illustrating a simulation result in a high SNR and an Extended Vehicular-A (EVA) channel environment according to an exemplary embodiment of the present invention.

FIG. 8 is a graph illustrating a simulation result in a high SNR and Extended Vehicular-A (EVA) channel environment according to an exemplary embodiment of the present invention. In the high SNR environment, the first method shows significant performance degradation. Meanwhile, the method according to an exemplary embodiment of the present invention and the second method show no significant difference in performance.

Figure 9:
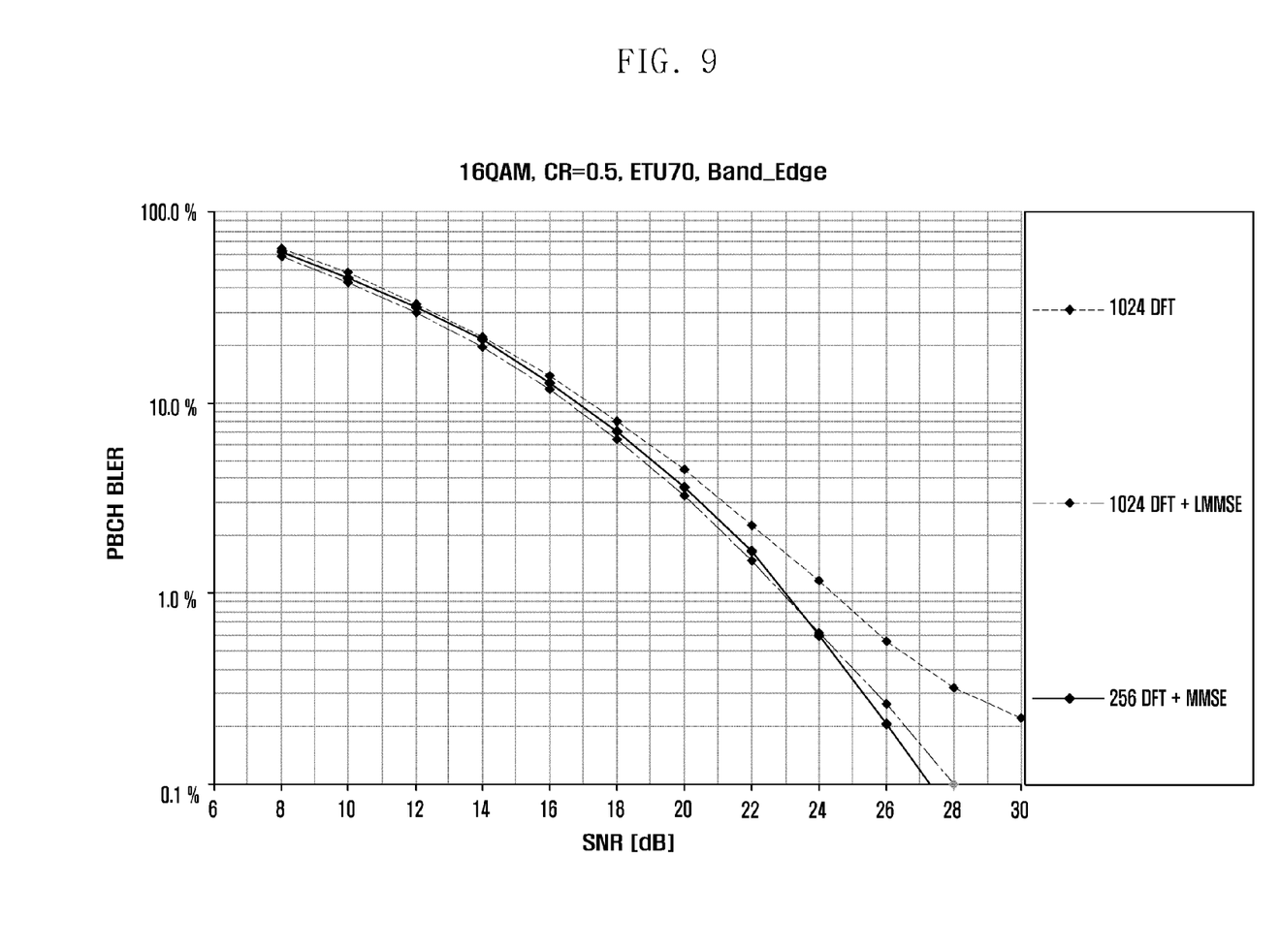
FIG. 9 is a graph illustrating a simulation result in a high SNR, an ETU channel and a Band Edge environment according to an exemplary embodiment of the present invention.

FIG. 9 is a graph illustrating a simulation result in a high SNR, an ETU channel and a Band Edge environment according to an exemplary embodiment of the present invention. The method according to an exemplary embodiment of the present invention is superior to the first method and almost equal to the second method in performance.

As described above, the channel estimation method and apparatus according to an exemplary of the present invention are capable of improving performance and reducing computational complexity.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instruction for performing specific logic function(s). Moreover, it should be noted that the functions of the blocks may be performed in different order in several modifications. For example, two successive blocks may be performed substantially at the same time, or may be performed in reverse order according to their functions.

The term "module" according to exemplary embodiments of the present invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

The foregoing disclosure has been set forth merely to illustrate the exemplary embodiments of the present invention and is not intended to be limiting. Since modifications of the exemplary embodiments of the present invention incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A channel estimation apparatus comprising:
   a time domain transformer for transforming received pilot subcarrier signals to time domain signals;
   a noise reducer for reducing noises of the time domain signals using multipath information of a channel;
   a frequency domain transformer for transforming the noise-reduced time domain signals to frequency domain signals; and
   a final channel estimator for estimating channel values of data subcarriers received using the frequency domain signals,
   wherein the noise reducer reduces the noise by verifying a multipath of the channel and multiplying a preset coefficient equal to or greater than 0 and less than 1 to the channel on which a signal is less than a threshold among the transformed time domain signals, and the multiplied channel corresponds to the verified multipath,
   wherein the final channel estimator comprises a Minimum Mean-Square Error (MMSE) estimator for estimating the channel value of the data subcarrier based on an MMSE technique which groups the pilot subcarriers into multiple sets of subcarriers and applies the MMSE technique in a unit of a subcarrier set, and
   wherein the MMSE estimator estimates the channel value using the following equation:

$$\hat{h}_{mmse} = w_{mmse} y$$
$$= R_{dp}(R_{pp} + \sigma^2 I)^{-1} y$$

where $w_{mmse}$ denotes a matrix for use in the channel value estimation, $R_{pp}$ denotes an auto-correlation value, $R_{dp}$ denotes a cross-correlation value, $\sigma 2$ denotes a variance of noise, I denotes an Identity matrix, $\hat{h}$ denotes the estimated channel, and y denotes the transformed time domain received signals.

2. The channel estimation apparatus of claim 1, wherein the noise reducer reduces noise using the following equation:

$$y'(n) = \begin{cases} y(n), & |y(n)|^2 \geq \mu\sigma^2 \\ \beta \cdot y(n), & |y(n)|^2 < \mu\sigma^2 \end{cases}$$
$$n = 0, 1, 2, \ldots, M-1, 0 \leq \beta \leq 1, 1 \leq \mu$$

where y(n) denotes the transformed time domain signals, y'(n) denotes the noise-reduced time domain signal, $\mu$ denotes a preset threshold for removing noise components, $\beta$ denotes the preset coefficient to be multiplied to the channel less than the threshold, and $\sigma 2$ denotes a variance of the noise.

3. The channel estimation apparatus of claim 1, wherein the time domain transformer transforms the signal received on the pilot subcarrier using at least one of an Inverse Fast Fourier Transform (IFFT), an Inverse Discrete Fourier Transform (IDFT), and a Discrete Cosine Transform (DCT).

4. The channel estimation apparatus of claim 1, further comprising a virtual pilot inserter for inserting virtual pilot subcarriers, when the number of received real pilot subcarriers is less than $n^2$, to make the sum of the number of real pilot subcarriers and the number of virtual pilot subcarriers equal to $n^2$,
   wherein the time domain transformer transforms signals on the real and the virtual pilot subcarriers into the time domain signal.

5. The channel estimation apparatus of claim 4, further comprising an initial channel estimator for performing initial channel estimation using the real pilot subcarriers,
   wherein the virtual pilot inserter inserts the virtual pilot subcarriers after the initial channel estimation.

6. A channel estimation method comprising:
   transforming received pilot subcarrier signals to time domain signals;
   reducing noise from the transformed time domain signals using multipath information of a channel;
   transforming the noise reduced time domain signals to frequency domain signals; and
   estimating channel values of data subcarriers using the frequency domain signals,
   wherein the reducing of the noise comprises verifying a multipath of the channel and multiplying a preset coefficient equal to or greater than 0 and less than 1 to the channel on which the signal is less than a threshold among the transformed time domain signals to reduce the noise, and the multiplied channel corresponds to the verified multipath,
   wherein the estimating of channel values comprises estimating the channel value of the data subcarrier based on an MMSE technique, by grouping the pilot subcarriers into multiple sets of subcarriers and applies the MMSE technique in a unit of a subcarrier set, and
   wherein the channel value is estimated by using the following equation:

$$\hat{h}_{mmse} = w_{mmse} y$$
$$= R_{dp}(R_{pp} + \sigma^2 I)^{-1} y$$

where $w_{mmse}$ denotes a matrix for use in the channel value estimation, $R_{pp}$ denotes an auto-correlation value, $R_{dp}$ denotes a cross-correlation value, $\sigma 2$ denotes a variance of the noise, I denotes an Identity matrix, $\hat{h}$ denotes the estimated channel, and y denotes the transformed time domain signals.

7. The channel estimation method of claim 6, wherein the noise is reduced by using the following equation:

$$y'(n) = \begin{cases} y(n), & |y(n)|^2 \geq \mu\sigma^2 \\ \beta \cdot y(n), & |y(n)|^2 < \mu\sigma^2 \end{cases}$$

$$n = 0, 1, 2, \ldots, M-1, 0 \leq \beta \leq 1, 1 \leq \mu \qquad 5$$

where y(n) denotes the transformed time domain signals, y'(n) denotes the noise-reduced time domain signal, μ denotes a preset threshold for removing noise components, β denotes a preset coefficient to be multiplied to the channel less than the threshold, and σ2 denotes a variance of the noise.

8. The channel estimation method of claim 6, wherein the transforming comprises using at least one of an Inverse Fast Fourier Transform (IFFT), an Inverse Discrete Fourier Transform (IDFT), and a Discrete Cosine Transform (DCT).

9. The channel estimation method of claim 6, further comprising inserting virtual pilot subcarriers, when the number (n) of received real pilot subcarriers is less than $n^2$, to make the sum of the number of real pilot subcarriers and the number of virtual pilot subcarriers equal to $n^2$, wherein the signals on the real and the virtual pilot subcarriers are transformed into the time domain signals.

10. The channel estimation method of claim 9, further comprising performing initial channel estimation using the real pilot subcarriers, wherein the virtual pilot subcarriers are inserted after the initial channel estimation.

\* \* \* \* \*